March 7, 1950   K. R. CLINE   2,499,631
WATER HEATER
Filed Aug. 1, 1947   2 Sheets-Sheet 1
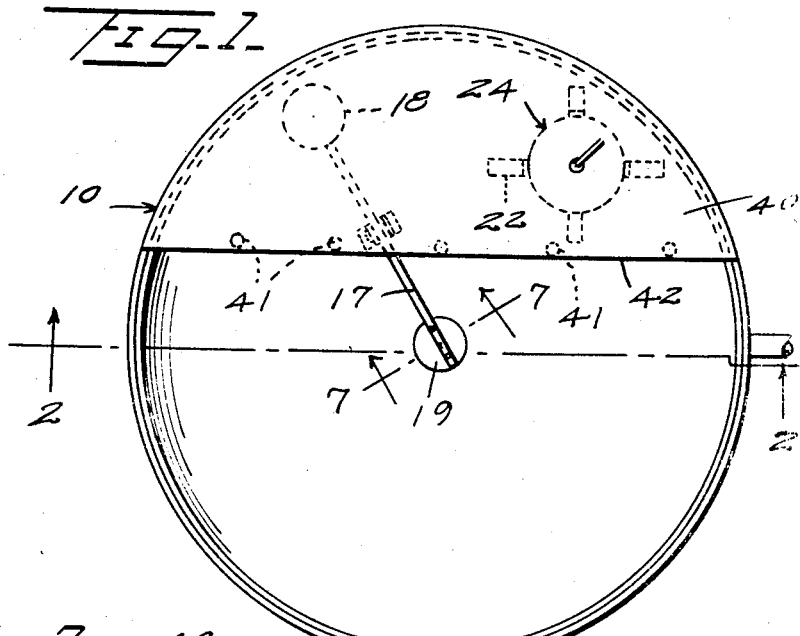
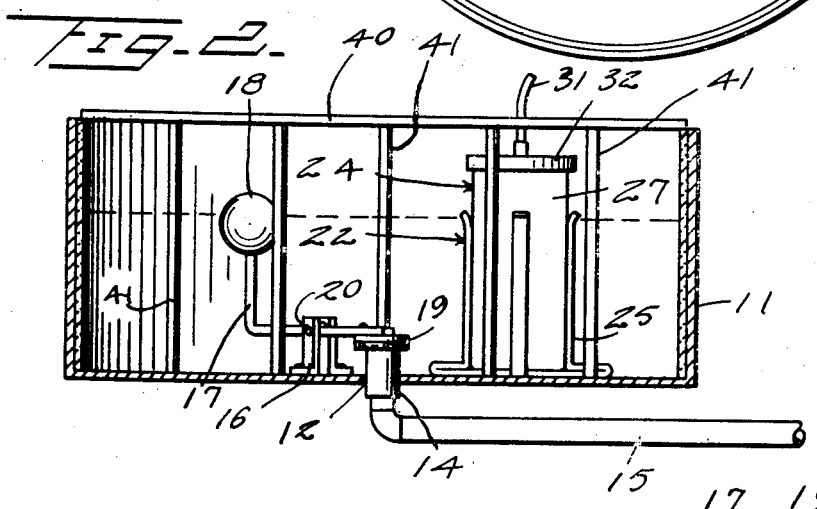
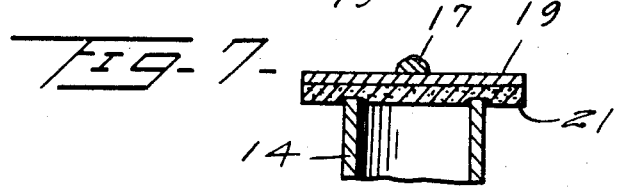
Inventor
K. R. Cline
By Kimmel & Crowell
Attorneys

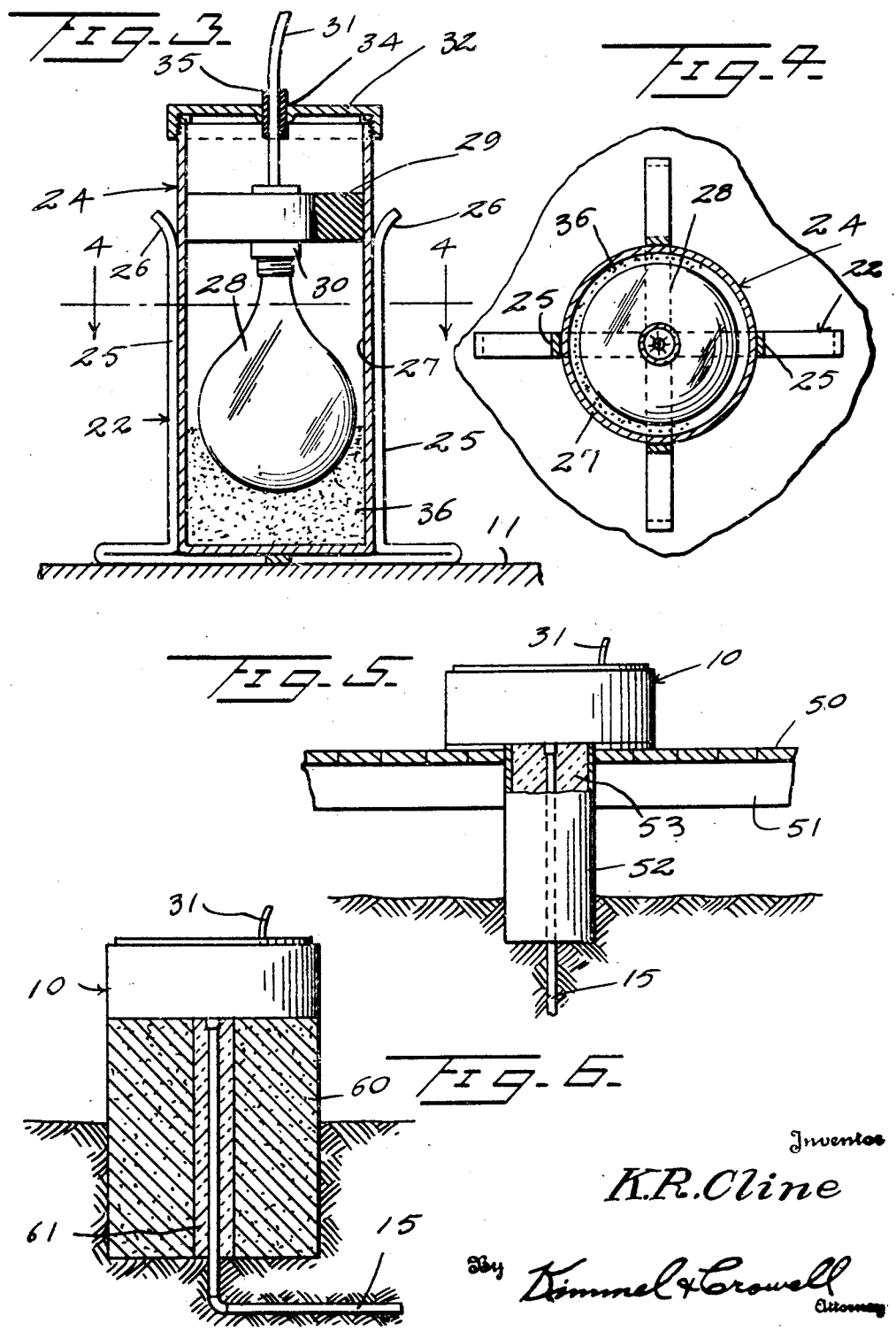

Patented Mar. 7, 1950

2,499,631

UNITED STATES PATENT OFFICE 2,499,631

WATER HEATER

Kermit R. Cline, Sandston, Va.

Application August 1, 1947, Serial No. 765,319

4 Claims. (Cl. 219—38)

This invention relates to an electric water heating apparatus for heating drinking water of livestock and poultry.

It is well known that various devices have been provided for heating drinking water for poultry and livestock, and that it is very desirable to provide warmed drinking water for such creatures, especially for poultry, as they require relatively large quantities of water for their well being and for best results to the breeder or poultry raiser. However, such devices have in the main been cumbersome, expensive and inconvenient to operate.

It is, therefore, a primary object of this invention to provide a means of warming drinking water for livestock and poultry, which is simple in construction, economical to operate, and inexpensive.

A further object is to provide in an apparatus of the kind hereinafter described and claimed, a heating means whereby the heat generated therefrom is confined to the lower part thereof so as to give as nearly as possible one hundred percent effective heat radiation and conduction.

It is desirable in the use of a device of the kind referred to that the water shall be so heated as to be kept warm near the surface, since the formation of ice begins here and the water consumed by the animals comes from this point, and thus, in this invention there is provided a means operating in conjunction automatically with the water level, for this purpose and having such desirable function.

Another object of this invention is to provide a device in which the heating element is easily and cheaply replaced, and the power of the element can be readily varied, and for this purpose the present device utilizes an ordinary electric lamp bulb, it being understood that such bulbs are cheap and easily replaceable. Furthermore, there need never be any danger of a failure to have a heating element available as there is invariably a supply of such bulbs in every building or farm dwelling having electric lighting.

Other desirable objects of the invention will become apparent from the specific description thereof and the illustration in the drawings forming a part hereof, the constructions illustrated being a practicable embodiment, however, not intended as a limitation.

In the drawings,

Figure 1 is a top plan view of a watering trough for livestock, constructed according to an embodiment of this invention, Figure 2 is a transverse section taken on the line 2—2 of Figure 1, Figure 3 is a vertical section taken through the heater, Figure 4 is a longitudinal section taken on the line 4—4 of Figure 3, Figure 5 is a side elevation, partly broken away and partly in section, of one manner of mounting this watering trough, Figure 6 is a side elevation, partly broken away and partly in section, of a second mounting means; and Figure 7 is a fragmentary section of the water inlet valve.

Referring to the drawings, the numeral 10 designates generally a watering trough for livestock or poultry, having a float operated valve for maintaining the level of the water in the reservoir at a definite height, and having an improved heater for applying heat to the surface of the water reservoir or at any predetermined level.

The watering trough 10 is formed of a reservoir 11 which is open at the top and provided with a water inlet opening 12 in the bottom thereof. A nozzle 14 is fixed on the end of a water inlet pipe 15 within the opening 12 of the reservoir 11. The nozzle 14 extends upwardly a short distance from the bottom of the reservoir 11.

A pair of vertically extending supporting arms 16 are fixed on the bottom of the reservoir 11 adjacent the opening 12, and a rod 17 is pivotally supported between the arms 16. A ball or float 18 is fixed on one end of the rod 17 and a valve 19 is carried by the arm 17 on the opposite side of the pivot 20.

A sealing washer or gasket 21 is fixed on the valve 19 and is adapted to cover the nozzle 14 for stopping the flow of water in the raised position of the ball or float 18. As the water level in the reservoir 11 falls, the float 18 will move downwardly, opening the valve 19 to permit the addition of water to maintain the determined or water level.

In the raising of poultry and the like, it is necessary to provide a certain amount of heat to their water. Various types of heaters have been provided and some of these are fixed in the reservoir, either at the bottom or on the sides thereof. In this manner only the edges of the heater are in contact with the water and the heat is not evenly distributed throughout the reservoir. Certain portions of the water will be hot adjacent the heater and water remote therefrom will be of a lower temperature. It is an object of this invention to provide a heater which will float on the water level so that the upper surface will be heated and the lower levels of the water may be cooler since the poultry will not reach the lower water levels and less heat is necessary for maintaining the water surface at a desired temperature.

A vertical upstanding guide member 22 is fixed on the bottom of the reservoir 11 on one side thereof for guiding the heater 24 in vertical movement while it is floating in the water. The guide member 22 is formed of vertically upstanding arms 25 fixed to the bottom of the reservoir 11 and annularly spaced part. The upper end 26 of the arms 25 is curved outwardly or flared for the easy insertion of the heater therein.

The heater 24 is formed of a receptacle 27 which is made of plastic or any other suitable material and opened at the top. The receptacle 27 is adapted to float on the water level in the reservoir. An electric light bulb 28 is provided as a heating element supported in the receptacle 27. An insulating supporting plug or disc 29 is slidably mounted in the receptacle 27 and a bulb socket 30 is fixed to and carried by the plug 29.

Electric wires 31 are connected to the plug socket 30 for connecting the electric light heater element into an electric circuit. A cover 32 is provided for the upper end of the hollow receptacle 27 for sealing the heating element 28 therein. The cover 32 is provided with an opening 34 in the center thereof through which the wires 31 are adapted to extend and a bushing or sealing member 35 is provided about the wire 31 within the hole 34 for sealing this opening.

For determining the level at which the heat will be applied to the water in the reservoir, ballast as 36 may be added and placed into the receptacle 27. The ballast 36 may be of sand or other suitable material of considerable weight and capable of transferring the heat from the heating element 28.

The receptacle 27 floating on the water will be in such a position at all times that the heat will be applied to the water at a definite level below the surface thereof, irrespective of the level of the water relative to the bottom of the reservoir 11. A cover 40 is provided over a portion of the top of the reservoir 11 and is adapted to be disposed over both the float 18 and the heater 24. The cover 40 will prevent the animals from disturbing the float valve or the heating element.

Vertically extending rods 41 are provided between the bottom of the reservoir 11 and the inner end 42 of the cover 40 for preventing any floating material on the surface of the water from coming in contact with the heater 24. The vertically extending rods 41 are spaced apart along the edge of the cover 40 any suitable distances. The watering trough 10 may be mounted in several different ways, as shown in Figures 5 and 6.

In Figure 5 there is shown a mounting for the water trough 10 in which it is supported on the floor 50 of a hen house or the like and by the joists 51 thereof. A tubular support 52 is provided which rests on the ground and engages the bottom of the reservoir 11 at its upper end and is filled with heat insulating material 53. In this manner the water pipe 15 will be kept from freezing. The water inlet pipe 15 is adapted to be extended through the concrete base 52.

In Figure 6 there is shown an alternate means of supporting the water trough 10 in which a base 60 is provided. The base 60 is adapted to be sunk into the ground and extends upwardly a short distance. The upper surface of the base 60 is substantially the same as the lower surface of the bottom of the watering trough 10. The water inlet pipe 15 which extends upwardly through the base 60 may be insulated or spaced from the base 60 by insulation 61, as shown in the drawings.

I do not mean to confine myself to the exact details of construction herein disclosed, but claim all variation falling within the purview of the appended claims.

What I claim is:

1. In a watering trough having a float valve, a heater comprising a buoyant cup-shaped receptacle, an electric light bulb in said receptacle, ballast in said receptacle for floating said receptacle in said trough at a predetermined depth, and guide means in said trough for said receptacle comprising vertically extending members spaced about the periphery of said receptacle for restraining said heater against all but vertical sliding movement.

2. A heater for a watering trough comprising a cup-heated buoyant receptacle, an electric light bulb slidably disposed in said receptacle, ballast in said receptacle for maintaining said receptacle at a determined depth in said trough, a guide member for said receptacle comprising vertically extending members spaced about the periphery of said receptacle in said trough comprising vertically extending members slidably engaging said receptacle, whereby the water in said trough may be heated at a determined level.

3. A heater for a watering trough comprising a buoyant receptacle, a light bulb socket slidably mounted in said receptacle, a light bulb engaging in said socket, circuit connecting means connected to said socket, ballast loosely carried in said receptacle whereby the degree of submersion of said receptacle may be varied, and vertical guide means carried by said trough loosely engaging about said receptacle whereby the surface of the water may be heated.

4. A heater for a watering trough comprising a buoyant receptacle having a cylindrical side wall and a bottom closure, ballast loosely carried in said receptacle, an insulating disc slidably carried by said side wall and supporting a centrally disposed electrical socket adapted to engage an electric light bulb, a cover for said receptacle formed with a central opening for the electrical leads to said socket and adapted to seal said receptacle, and guide means for said receptacle comprising crossed base members having vertically disposed arms extending from the ends thereof and adapted to slidably engage the side wall of said receptacle.

KERMIT R. CLINE.

REFERENCES CITED

The following references are of record in the file of this patent:

UNITED STATES PATENTS

| Number | Name | Date |
| --- | --- | --- |
| 1,361,028 | Drake | Dec. 7, 1920 |
| 2,336,011 | Haberstump | Dec. 7, 1943 |
| 2,432,918 | McCaskell | Dec. 16, 1947 |